US012739178B2

(12) United States Patent
Bascao

(10) Patent No.: US 12,739,178 B2
(45) Date of Patent: Sep. 15, 2026

(54) MITIGATING NETWORK DEGRADATION USING MACHINE LEARNING TECHNIQUES

(71) Applicant: T-Mobile USA, Inc., Bellevue, WA (US)

(72) Inventor: Michael C. Bascao, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 76 days.

(21) Appl. No.: 18/977,679

(22) Filed: Dec. 11, 2024

(65) Prior Publication Data

US 2026/0163812 A1 Jun. 11, 2026

(51) Int. Cl.
*H04L 41/16* (2022.01)
*H04W 24/02* (2009.01)

(52) U.S. Cl.
CPC ............. *H04L 41/16* (2013.01); *H04W 24/02* (2013.01)

(58) Field of Classification Search
None
See application file for complete search history.

(56) References Cited

U.S. PATENT DOCUMENTS 7,099,660 B2 8/2006 Boehmke
9,197,511 B2 11/2015 Mathis
9,565,318 B2 2/2017 Tapia et al.
10,063,578 B2 8/2018 Flacher et al.
10,261,851 B2 4/2019 Velipasaoglu et al.
10,354,201 B1 7/2019 Roy et al.
10,440,503 B2 10/2019 Tapia
10,452,992 B2 10/2019 Lee et al.
10,680,889 B2 6/2020 Vasseur et al.
10,708,151 B2 7/2020 Dixon et al.
10,812,330 B2 10/2020 Le et al.
10,977,711 B1 4/2021 Verma et al.
11,018,958 B2 5/2021 Tapia
11,151,471 B2 10/2021 Niininen et al.
(Continued)

FOREIGN PATENT DOCUMENTS

EP 3224987 A1 10/2017
EP 3673375 B1 4/2022
(Continued)

*Primary Examiner* — Fadi Haj Said
(74) *Attorney, Agent, or Firm* — Perkins Coie LLP

(57) ABSTRACT

Systems and methods for assessing anomalous occurrences at a telecommunications service network are disclosed herein. The system accesses a set of telecommunications data records for a plurality of user devices operating on the telecommunications service network, and inputs at least a portion of data from the set of telecommunications data records into a machine learning model to identify anomalous occurrences. The system can append the anomalous occurrences to a first data structure storing anomalous occurrences across the telecommunications service network. The system can access values of metrics indicative of changes in device conditions, network operability conditions, or both and use the data to generate a second data structure. The system can establish a correlation between anomalous occurrences stored in the first data structure and one or more changes in a subset of device conditions and/or network operability conditions stored in the second data structure.

20 Claims, 10 Drawing Sheets

(56) References Cited

U.S. PATENT DOCUMENTS 11,195,123 B2 12/2021 Zaifman et al.
11,722,380 B2 8/2023 Fiumara et al.
11,743,237 B2 8/2023 Fiumara et al.
11,748,568 B1 9/2023 Orhan et al.
11,770,307 B2 9/2023 Veggalam et al.
11,800,398 B2 10/2023 Amer
11,832,119 B2 11/2023 Biswas et al.
11,902,308 B2 2/2024 Abrahamian et al.
11,954,177 B2 4/2024 Singla et al.
11,956,129 B2 4/2024 Shahid et al.
12,095,628 B2 9/2024 Lukens et al.
12,107,742 B2 10/2024 Arora et al.
12,113,686 B2 10/2024 Juneja et al.
12,199,997 B1 * 1/2025 Lin ......................... H04L 41/22
12,348,357 B1 * 7/2025 Overcash ............ H04L 41/0663
2012/0284080 A1 11/2012 De Oliveira et al.
2022/0022076 A1 * 1/2022 Saluja ................... H04W 24/04
2022/0210682 A1 * 6/2022 Kulkarni ................. H04L 41/16
2022/0329328 A1 10/2022 Paulraj et al.
2023/0010095 A1 1/2023 Alabbasi et al.
2023/0033680 A1 2/2023 Whatley
2023/0047174 A1 2/2023 Pharr et al.
2023/0117824 A1 4/2023 Coster et al.
2023/0131468 A1 4/2023 Amer
2023/0198855 A1 6/2023 Ganesan et al.
2023/0209351 A1 6/2023 Djankovic et al.
2023/0351248 A1 11/2023 Muhammad et al.
2024/0015499 A1 1/2024 Nguyen et al.
2024/0054124 A1 2/2024 Nikain et al.
2024/0069885 A1 2/2024 Kharate et al.
2024/0107301 A1 3/2024 Koral et al.
2024/0121636 A1 4/2024 Wang et al.
2024/0171480 A1 5/2024 Sheoran et al.
2024/0214885 A1 6/2024 Tchouankem et al.
2024/0275605 A1 8/2024 Cai et al.
2024/0345913 A1 10/2024 Bethamsetty et al.
2024/0364581 A1 * 10/2024 Pannu ................. H04L 41/0677
2024/0372788 A1 11/2024 Glenn et al.
2024/0373404 A1 11/2024 Glenn et al.

FOREIGN PATENT DOCUMENTS

EP 4432719 A1 9/2024
JP 6739673 B1 7/2020
WO 2021139881 A1 7/2021

* cited by examiner

400

410A

```
{
"timestamp": "2024-10-29T14:23:00Z",
"anomaly_type": "Latency Spike",
"severity_level": "Major",
"affected_kpis": {
        "latency": {
                "pre_anomaly": 40,
                "during_anomaly": 500
        },
        "packet_loss": {
                "pre_anomaly": 0.1,
                "during_anomaly": 5.5
                }
        },
"location": "Cell_Tower_123",
"device_id": "IMEI_012345678901234",
"network_context": {
        "technology": "5G",
        "frequency_band": "3.5 GHz"
        },
"duration": "00:05:00",
"remediation_status": "Investigating"
}
...
```

```
{
"change_id": "12345",
"timestamp": "2024-10-29T14:00:00Z",
"change_type": "Configuration Update",
"affected_network_elements": ["Router_A", "Switch_45", "Cell_Tower_123"],
"change_description": "Updated routing table to improve latency for
Cell_Tower_123",
"initiator": "User_ABC",
"approval_status": "Approved",
"status": "Completed",
"change_reason": "Performance Improvement",
"risk_assessment": "Low Risk",
"rollback_plan": "Revert routing table to previous configuration if latency
increases",
"dependencies": ["Change_12344"],
"impact_scope": "Region-Wide",
"maintenance_window": {
        "start": "2024-10-29T13:00:00Z",
        "end": "2024-10-29T14:30:00Z"
},
}
...
```

*FIG. 4B*

MITIGATING NETWORK DEGRADATION USING MACHINE LEARNING TECHNIQUES

BACKGROUND

A telecommunications network is established via a complex arrangement and configuration of many cell sites that are deployed across a geographical area. For example, there can be different types of cell sites (e.g., macro cells, micro cells, and so on) positioned in a specific geographical location, such as a city, neighborhood, and so on. These cell sites strive to provide adequate, reliable coverage for mobile devices (e.g., smartphones, tablets, and so on) via different frequency bands and radio networks such as a Global System for Mobile (GSM) mobile communications network, a code/time division multiple access (CDMA/TDMA) mobile communications network, a third, fourth, or fifth generation (3G/4G/5G) mobile communications network (e.g., General Packet Radio Service (GPRS/EGPRS), Enhanced Data rates for GSM Evolution (EDGE), Universal Mobile Telecommunications System (UMTS), or long-term evolution (LTE) network), 5G mobile communications network, IEEE 802.11 (WiFi), or other communications networks. The devices can seek access to the telecommunications network for various services provided by the network, such as services that facilitate the transmission of data over the network and/or provide content to the devices.

Networks such as these facilitate communications between millions of devices; however, with growing interconnectivity and thousands of variables such as type of device, location, and/or the like, it is often difficult to identify root causes of network degradation at these devices. For example, doing so typically requires that a system process data from hundreds of thousands of network sites, with each site having multiple cells or sectors. This translates to billions of rows of data generated per day. By the time the data can be parsed in an interpretable format, much of the data is rendered useless because too much time has elapsed. This often means that time-sensitive reconfigurations or corrective measures will not be implemented until it is too late. Furthermore, data needs to be integrated from various sources, including enhanced data records (EDRs), call records, network measurement data. Combining these disparate data sets adds further complexity to identifying underlying issues for network degradation.

BRIEF DESCRIPTION OF THE DRAWINGS

Detailed descriptions of implementations of the present invention will be described and explained through the use of the accompanying drawings.

FIG. 4A is a block diagram illustrating a first exemplary data structure storing anomalous occurrences, such as those indicative of network degradation, in accordance with embodiments herein.

FIG. 4B is a block diagram illustrating a second exemplary data structure storing changes in device conditions and/or network operability conditions, in accordance with embodiments herein.

Figure 1:
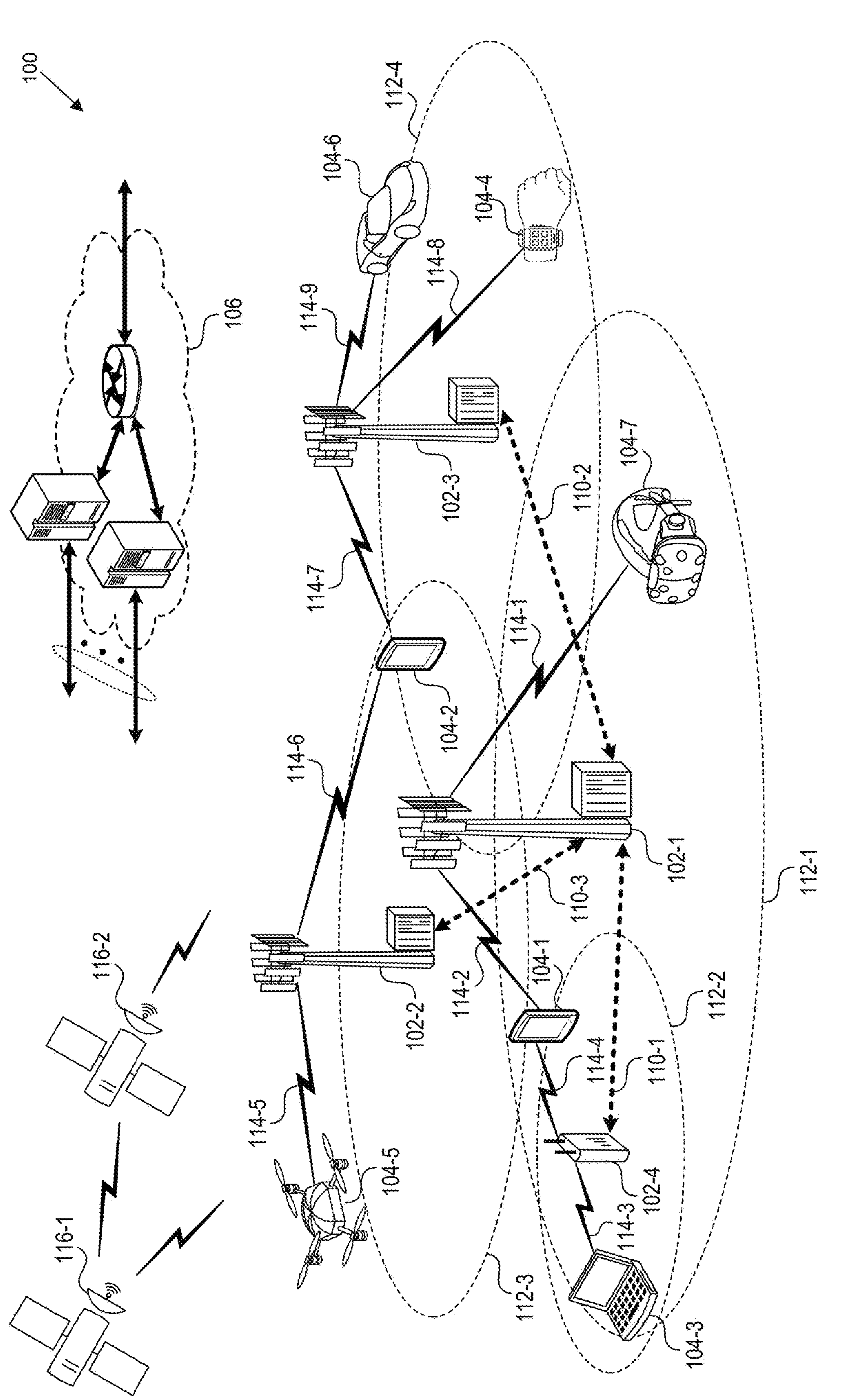
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Providing and ensuring reliable network connectivity is a consistent issue, especially as the number of interconnected devices and systems communicating over networks grows. Many integral services are reliant on devices connected to networks, such as in emergency response, where delays or disruptions can have life-threatening consequences. In such an application, ensuring seamless communication allows first responders to coordinate effectively and have access to real-time information which can impact decision-making at key junctures. Identifying network degradation and anomalies plays a vital role in maintaining this reliability by preventing service disruptions and minimizing bottlenecks that could impair critical applications.

Furthermore, hackers and bad actors often target network degradation as part of tactics to disrupt services, gain unauthorized access, or mask other malicious activities. Network degradation can be both the direct goal of an attack and serve as a diversion while more damaging operations are carried out. For example, in Distributed Denial of Service (DDoS) attacks, hackers flood networks to overwhelm capacity on the network and can thus prevent legitimate users from accessing critical services. In other examples, attackers can deliberately degrade network performance as a diversion while conducting more covert operations. As bad actors become more and more sophisticated, the methods with which network connectivity is degraded may become more complex over time. As a result, identifying causes of network degradation and responding to mitigate the issues have become slow.

Whether it is to prevent bad actors from targeting critical applications reliant on network connectivity or to enable integral services to run on networks, quickly identifying problems at the network and correcting those issues is of utmost importance. However conventional methods of identifying root causes of network degradation are limited and time-consuming. In fact, conventional methods are so time-consuming that they often cause outages or poor connectivity that last hours before a problem is identified and fixed.

In some cases, conventional methods include an engineer manually generating reports to find specific problems in a cluster/zip code or specific area. If an assigned engineer is reviewing around 500 to 1000 sites, with each site including 10-12 cells or carrier bands for LTE and 5G, it means a singular engineer must track the performance of around 12,000 cells in sum. It often may take up to 18 hours to identify a problem before it can be resolved. Furthermore, conventional methods for anomaly detection using traditional computation are prone to runtime errors, where several benchmarks using rolling averages and sums are compared against current values. Furthermore, processing rolling sums and averages in key performance indicator (KPI) data from 12,000 cells for one operator is resource-intensive and computationally expensive. As mentioned herein, doing so requires heavy processing that can take 18 hours.

Accordingly, a mechanism is desired that enables a time and resource-efficient method for identifying anomalies (e.g., network degradation) and identifying solutions for quickly mitigating network degradation. In particular, systems and methods disclosed herein enable a model to leverage machine learning techniques that can identify network degradation and quickly correlate the degradation with changes such as parameter changes, outage information, special events, configuration changes, software updates, etc. As described herein, machine learning techniques may be used to identify network degradation. Doing so prevents the need for performing resource-intensive rolling sum and average calculations for determining network degradation which in turn expedites the degradation identification process and resolution process.

However, while machine learning techniques are highly efficient in identifying patterns and making predictions based on historical data, they can struggle to adapt when the underlying environment or field evolves unexpectedly. This phenomenon is often referred to as concept drift. Telecommunications is especially prone to concept drift due to shifts in technology, shifts in mobile app usage, streaming habits, or sudden spikes in video calls. This is why simply having a machine learning model for identifying root causes of network degradation is inefficient. Given that potential root causes such as software and hardware updates are typically new and unique to each iteration, it is difficult to use one machine learning model to identify root causes for any prolonged period of time and inefficient to continuously retrain new models.

As a result, techniques described herein use a machine learning model to identify instances of network degradation, rather than the cause of the network degradation. The system can then perform a separate correlation process to determine potential causes of network degradation. In this way, concept drift can be avoided for the root causes, which are always in flux. Instead, the machine learning model may simply identify cases of network degradation for which indicators are less prone to change. Furthermore, techniques described herein periodically evaluate the model performance such that concept drift for identifying network degradation is mitigated. If the model's performance is low, the system can refine the model and load the refined model in the old one's place.

In particular, once instances of network degradation are identified, data associated with the instances may be appended to a first data structure. A second data structure comprising change data such as parameter changes, outage information, special events, configuration changes, software updates, etc. may be accessed. The first and second data structures may be correlated such that the changes correlating most strongly with the instances of network degradation can be identified as root causes and corrective actions may be taken. For example, the corrective action may be instructions for reconfiguring a device, and/or the like.

In some examples, a user device on the telecommunications network may transmit a request to the system to identify a corrective action for mitigating network degradation experienced on the user device. The system may, responsive to receiving the request, identify one or more changes that correlate with network degradation experienced on the user device and transmit instructions for mitigating the issue. For example, the instructions may be instructions to perform a software or hardware update, or for reconfiguring data files on the device. In other examples, the instructions may include instructions to manually or physically change the device.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 gigahertz (GHz) or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 provides communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station as compared to a macro cell and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100, including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The DL transmissions can also be called forward link transmissions, while the UL transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service (QoS) requirements and multi-terabits per second data transmission in the 6G and beyond era, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged WiFi and core architecture to increase and improve indoor coverage.

5G Core Network Functions

Figure 2:
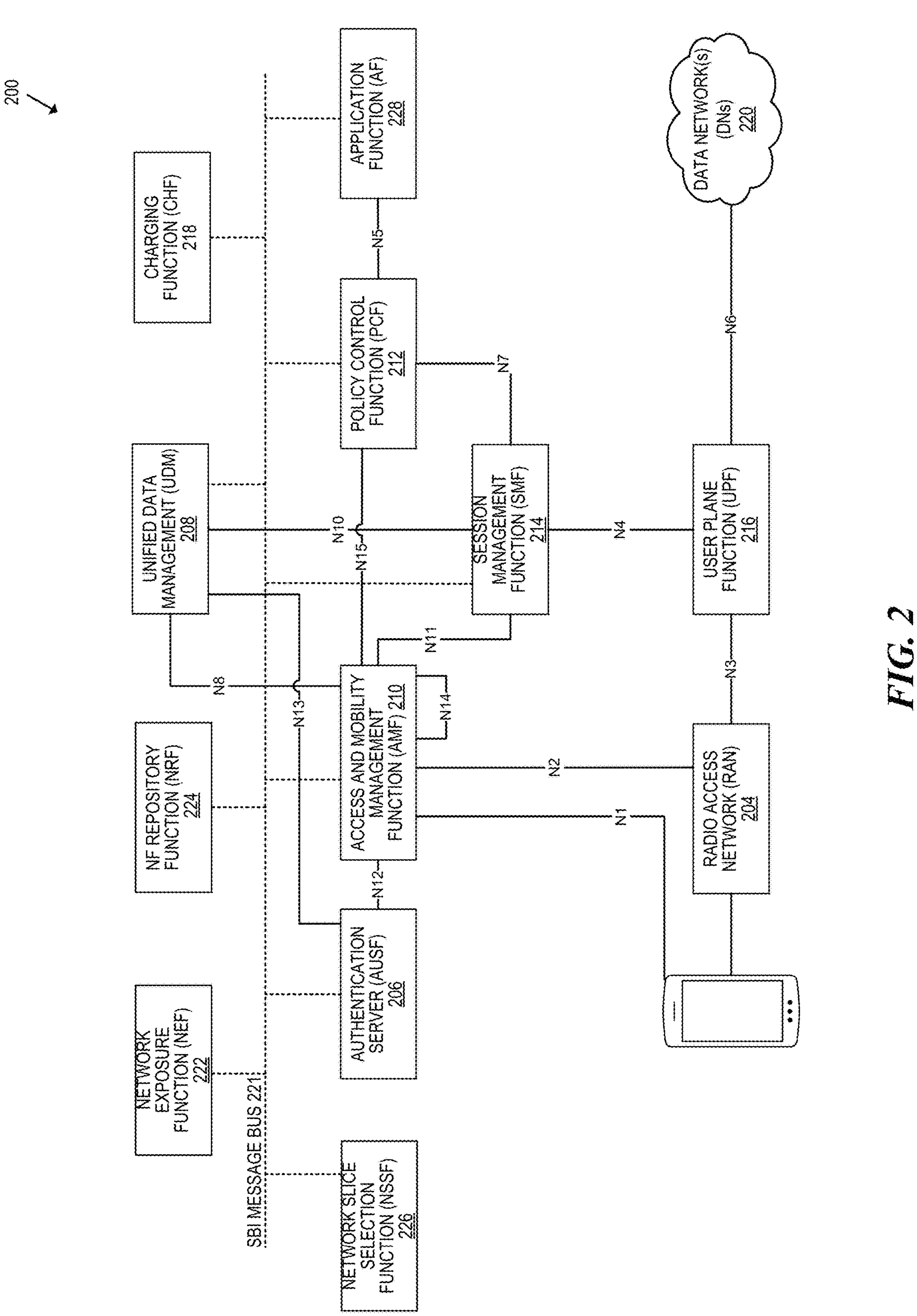
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device can access the 5G network through a NAN (e.g., gNB) of a RAN 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service-Based Architecture (SBA) through a Service-Based Interface (SBI) 221 that uses Hypertext Transfer Protocol (HTTP)/2. The SBA can include a network Exposure Function (NEF) 222, a NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. the wireless device 104 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more application functions (Afs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of network functions once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Although exemplary embodiments are described herein with reference to telecommunications and networks, the concepts of the present invention are not limited in application to such networks. It will be appreciated by those of skill in the art that the concepts of the present invention may be applied outside of telecommunications and networking, such as through a single device or a cluster of remote devices.

Suitable Computing Environments

Figure 3A:
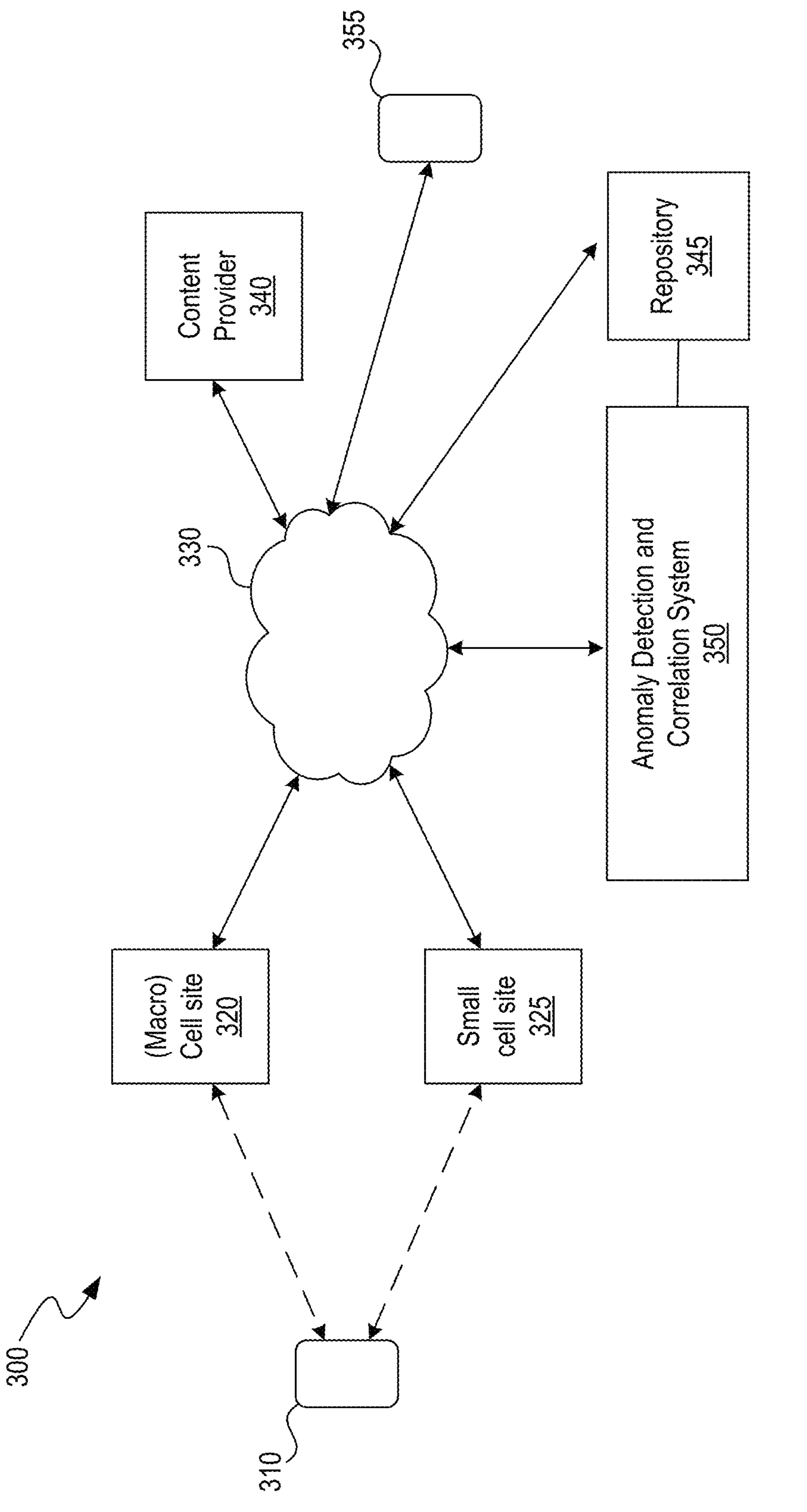
FIG. 3A is a block diagram illustrating a suitable computing environment for assessing anomalous occurrences at a telecommunications service network, in accordance with embodiments herein.

FIG. 3A is a block diagram illustrating a suitable computing environment for assessing anomalous occurrences at a telecommunications service network, in accordance with embodiments herein. As described herein, the computing environment 300 of FIG. 3A can be used to identify anomalous occurrences (e.g., network degradation) and correlate the anomalies with network changes or device changes that may be an underlying cause for the anomalous occurrence. The computing environment may also be used to transmit instructions to correct the network degradation.

Computing environment 300 can include one or more user device(s) 310, one or more cell sites 320 and 325, telecommunications network 330, content provider 340, cloud data repository 345, one or more other user devices 355, and anomaly detection and correlation system 350. User device(s) 310, such as mobile devices or UE associated with users (such as mobile phones (e.g., smartphones), tablet computers, laptops, and so on), IoT devices, vehicles (e.g., smart vehicles), devices with sensors, and so on, can be configured to receive and transmit data, stream content, and/or perform other communications or receive services over a telecommunications network 330, which is accessed by the user device 310 over one or more cell sites 320, 325. For example, the user device 310 accesses a telecommunications network 330 via a cell site at a geographical location that includes the cell site in order to transmit and receive data (e.g., stream or upload multimedia content) from various entities, such as a content provider 340, content repository 345, and/or other user devices 355 on the telecommunications network 330 and via the cell site 320. Furthermore, content repository 345 may be directly connected to the anomaly detection and correlation system 350 as can be seen in FIG. 3A. For example, the repository and the system may exist on the same physical machine or server. Alternatively or additionally, the system and repository may share memory access, e.g., which may be used to directly exchange data. In some examples, the repository and system may both reside within a same application or runtime environment and may share in-memory data structures. In another example, the system may embed a database or repository directly within the environment, e.g., through use of SQLite.

The cell sites can include macro cell sites 320, such as base stations, small cell sites 325, such as pico cells, micro cells, or femto cells, and/or other network access components or sites. The cell sites 320, 325 can store data associated with their operations, including data associated with the number and types of connected users, data associated with the provision and/or utilization of a spectrum, radio band, frequency channel, and so on, provided by the cell sites 320, 325, and so on.

According to some examples, computing environment 300 may be configured to identify anomalous occurrences (e.g., network degradation) and perform correlation and/or determine an association between the anomalous occurrences and other changes that occurred, e.g., at the site level, cell level, or device level. For example, a machine learning model may be trained to identify the anomalous occurrences.

As referred to herein, an anomalous occurrence may be any indication of a symptom of network degradation, such as experiencing dropped calls, slow wi-fi or internet speeds, inability to connect to wi-fi, high buffering times in streaming services, slow file downloads or uploads, lag or delays in video conferencing, frequent device disconnections, high latency, and/or the like. The computing environment 300 may receive, access, or otherwise obtain telecommunication data records such as from a centralized repository. At least a portion of the data of the telecommunication data records may be used as input into a machine learning model to determine whether or not anomalous occurrences have taken place.

Telecommunications data records may be stored at a centralized repository, such as repository 345, for a plurality of user devices operating on the telecommunications service network. In one example, the centralized repository may store data relating to site-specific or cell-specific performance. In this example, the system described herein can be used to help operators quickly identify anomalous occurrences and identify potential problem areas and events that they can look at to solve the issue and mitigate network degradation. Alternatively, or additionally, the centralized repository may be used to access telecommunications data records for a specific user device. For example, a user at a user device (e.g., device 355) may transmit a request for resolving network degradation at a device-specific level. Thus, according to some examples, the communication module 352 may be used to access telecommunications data records specific to the device experiencing the network degradation as well as those of other relevant devices (e.g., similar technology, similar location, etc.).

The set of telecommunications data records may include user device information for the plurality of user devices and network performance metrics. Site-level data records may include Network Performance Management Reports (NPMRs), Maintenance Performance Reports (MPRs), Alarm Log Records (ALRs) Network Management System (NMS) logs, and/or the like. Cell-level data records may include Call Data Records (CDRs), Event Data Records (EDRs), and/or the like. Device-level data records may include IP detail records (IPDRs), Short Message Service detail records (SMS-DRs), quality of experience (QoE) record, etc. According to some examples, the centralized repository is a data lake connected to connected to one or more other devices or nodes at the network. In some examples, the set of telecommunications data records may include disparate types of telecommunications data records including enhanced data records (EDRs) or call data records (CDRs) and standardizing the disparate types of telecommunications data records into a predetermined format may be required prior to usage at the machine learning module 354.

Once the telecommunications data records are used to determine whether or not anomalous occurrences have taken place, the system may perform correlation between the anomalous occurrences and changes in device conditions and/or network operability such as seasonal changes, device changes, location changes, user call patterns, or changes in network events or customer lifestyle to identify underlying causes. For example, events and historical data (e.g., for seasonality factor calculation) may be obtained from repository 345. As described herein device conditions and/or network operability may include, among others, added capacity, a detected outage (e.g., short, intermediate, long outages), adjustments and changes to the antenna vertical and horizontal beamwidth, antenna total downtilt adjustments, base station reference signal power adjustments, physical cell identity assignment adjustments, antenna mechanical tilt adjustments, radio maximum power settings adjustments, antenna electrical tilt adjustments, antenna azimuth adjustments, software updates, special events such as sporting events, concerts, and/or the like.

Using the identified causes, the system may perform a series of corrective actions to resolve the anomalous occurrences. For example, the system may automatically transmit instructions for reconfiguring a cell site (e.g., cell sites 320 and 325), a base station (e.g., eNodeB), a user device and/or other components of the network. Alternatively, or additionally, the system may alert an operator with recommendations or request operator permission to configure components of the network.

FIG. 3A and the discussion herein provide a brief, general description of a suitable computing environment 300 in which the anomaly detection and correlation system 350 can be supported and implemented. Although not required, aspects of the anomaly detection and correlation system 350 are described in the general context of computer-executable instructions, such as routines executed by a computer, e.g., a mobile device, a server computer, or a personal computer (PC). The system can be practiced with other communications, data processing, or computer system configurations, including: Internet appliances, handheld devices (including tablet computers and/or personal digital assistants (PDAs)), IoT devices, all manner of cellular or mobile phones, multi-processor systems, microprocessor-based or programmable consumer electronics, set-top boxes, network PCs, mini-computers, mainframe computers, and the like. Indeed, the terms "computer," "host" and "host computer," and "mobile device" and "handset" are generally used interchangeably herein and refer to any of the above devices and systems as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory, computer-readable storage media), including magnetically or optically readable computer discs, hard-wired or preprogrammed chips (e.g., Electrically Erasable Programmable Read-only Memory (EEPROM) semiconductor chips), nanotechnology memory, or other data storage media. Indeed, computer-implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system reside on a server computer while corresponding portions reside on a client computer, such as a mobile or portable device, and thus, while certain hardware platforms are described herein, aspects of the system are equally applicable to nodes on a network. In alternative implementations, the mobile device or portable device can represent the server portion, while the server can represent the client portion.

In some implementations, the user device 310 and/or the cell sites 320, 325 can include network communication components that enable the devices to communicate with remote servers or other portable electronic devices by transmitting and receiving wireless signals using a licensed, semi-licensed, or unlicensed spectrum over a communications network, such as telecommunications network 330. In some cases, the telecommunications network 330 can be comprised of multiple networks, even multiple heterogeneous networks, such as one or more border networks, voice networks, broadband networks, service provider networks, Internet Service Provider (ISP) networks, and/or Public Switched Telephone Networks (PSTNs) interconnected via gateways operable to facilitate communications between and among the various networks. The telecommunications network 330 can also include third-party communications networks such as a GSM mobile communications network, a CDMA/TDMA mobile communications network, a 3G/4G mobile communications network (e.g., GPRS/EGPRS, EDGE, UMTS, or LTE network), 5G mobile communications network, WiFi, or other communications networks. Thus, the user device is configured to operate and switch among multiple frequency bands for receiving and/or transmitting data.

Further details regarding the operation and implementation of the anomaly detection and correlation system 350 will now be described.

Examples of Systems for Anomaly Detection and Correlation

Figure 3B:
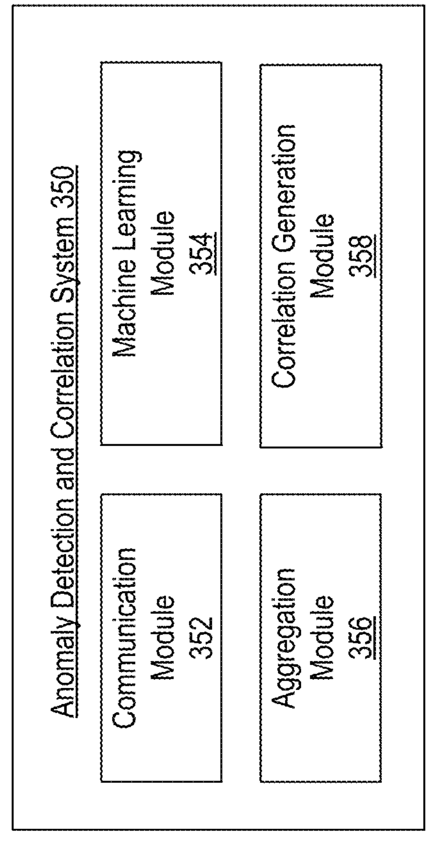
FIG. 3B is a block diagram illustrating the components of an exemplary anomaly detection and correlation system, in accordance with embodiments herein.

FIG. 3B is a block diagram illustrating the components of an exemplary anomaly detection and correlation system. Anomaly detection and correlation system 350 can include functional modules that are implemented with a combination of software (e.g., executable instructions or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the specific functions described herein. For example, the anomaly detection and correlation system 350 includes a communication module 352, a machine learning module 354, an aggregation module 356, and a correlation generation module 358, each of which is discussed separately below.

Communication Module

Communication module 352 of anomaly detection and correlation system 350 can include software and/or hardware components allowing for the transmission and/or receipt of information between two or more devices. Communication module 352 can include a wireless communication module, such as a cellular radio or WiFi antenna, to allow for communication over wireless networks and/or can additionally or alternatively include a network card (e.g., a wireless network card and/or a wired network card) that is associated with software to drive the card.

The communication module 352 is configured and/or programmed (e.g., via the above-mentioned techniques) to interface between a device (e.g., user device(s) 310, one or more other user devices 355), cell sites (e.g., cell sites 320, 325), a content provider (e.g., content provider 340), and a cloud data repository (e.g., cloud data repository 345) such as via a network (e.g., telecommunications network 330) to receive and transmit data such as requests from user devices, telecommunications data records such as from a centralized data repository, or metrics indicative of changes in device conditions and/or network operability. When communication module 352 receives data, the module can pass on relevant portions of data to different modules of the anomaly detection and correlation system 350. Communication module 352 can also be configured to generate and transmit notifications and/or recommendations to operators. Alternatively or additionally, communication module 352 can be used to generate and transmit instructions for causing reconfiguration at components of the network, e.g., to resolve network degradation.

According to some examples, the communication module 352 may receive, e.g., such as from one or more users at a user device 310 or other user devices 355, a request for resolving network degradation experienced at the user device. In this case, the request may trigger accessing telecommunications data records and subsequently performing correlation to identify corrective actions. In some embodiments, the user may transmit the request through interaction at an application. The application may send an API request to anomaly detection and correlation system 350. For example, the user may input a request such as "my wifi is slow, how should I fix this?" through a chatbot or another conversational agent. The request may include device identifier information, such as a media access control (MAC) address, an international mobile equipment identity (IMEI) number, a serial number, and/or the like.

Responsive to receiving the user request, the communication module 352 can access telecommunication data records from a centralized repository as described herein. In some examples, the telecommunication data records that are accessed and subsequently used to identify instances of network degradation at the user device may be specific to the user device. For example, they can include CDRs, data session records, and/or the like. For example, the communication module 352 may query the repository using the device identifier to find relevant data.

Alternatively or additionally, the system can identify network degradation or other anomalous occurrences at a broader scope as opposed to a device-specific scope. For example, the system may be used to identify anomalies (e.g., network degradation) on a site-specific level, cell-specific level, or across all sites in a geographical location (e.g., state-wide, nation-wide, global, etc.). In this example, rather than accessing data responsive to a user request, the system can instead continuously retrieve telecommunications data records to identify corrective actions for resolving network degradation, e.g., in real time. For example, the system can retrieve data on a periodic basis, such that after a predetermined period of time has lapsed, the communication module 352 transmits a request to the repository for new data.

Whether the data retrieval is continuous or triggered based on a user request, communication module 352 may be configured to retrieve telecommunications data records to identify specific instances of network degradation or other anomalous behavior. For example, communication module 352 may enable communication between anomaly detection and correlation system 350 and various repositories and databases that store the telecommunications data. In particular, communication module 352 may be used to access a centralized repository, such as repository 345 configured to store telecommunications data records for various components (e.g., sites, base station, etc.) of the network.

In some examples, the centralized repository is a data lake that stores raw (e.g., in its original form) telecommunications data records which include user device information for the plurality of user devices and network performance metrics. The data lake may ingest data from the different components of the network and store the data in its original form without the need for structuring or transforming the data upfront.

The communication module 352 can be configured to obtain the records using a combination of techniques. In some examples, the data in the data lake may be partitioned based on date and time. In this case, the communication module 352 can query and ingest records corresponding to specific intervals of time. For example, the module can query for and ingest records from a previous point in time to a current time. As described herein, the communication module 352 can generate and transmit the query to the repository (e.g., data lake) responsive to receiving a user request or periodically. The data lake can also tag the data using metadata to more easily search the data. For example, the data lake can include a metadata layer or data catalog including details such as data source, format, ownership, timestamp, and/or the like. The communication module can generate queries for data based on the device type or location. The metadata layer may be searchable and can be used to find records for a specific device or site component.

Once the model retrieves data from the repository, the telecommunications data records are used by the machine learning module 354 to determine whether or not anomalous occurrences have taken place. The system can subsequently perform correlation between the anomalous occurrences and events such as changes in device conditions and/or network operability to identify underlying causes. In order to do so, the system may access, from a plurality of different network elements of the telecommunications service network, values of metrics indicative of those events or changes. For example, accessing the metrics indicative of the changes in device conditions and/or network operability conditions may include accessing network elements specific to a cell site of the telecommunications service network to obtain metrics indicative of changes occurring at a site-specific level. According to some examples, the metrics may be metric values accessed directly from network elements, from a telecom database, or both. Changes in device conditions and/or network operability may include seasonal changes, device changes, location changes, user call patterns, or changes in network events or customer lifestyle.

Using the identified causes, the system can perform one or more corrective actions to resolve the anomalous occurrences. In particular, the system can transmit instructions configured to cause reconfiguration of one or more attributes that impact the subset of device conditions and/or network operability conditions at the at least one device. For example, the system can automatically transmit instructions for reconfiguring a cell site (e.g., cell sites 320 and 325), a base station (e.g., eNodeB), a user device and/or other components of the network. Alternatively, or additionally, the system can alert an operator with recommendations or request operator permission to configure components of the network. The communication module can be used to communicate the alerts or to transmit an instruction for causing display of information on the user device. In some examples, the system can determine the specific reconfigurations and the one or more attributes using a secondary machine learning model or using a database storing known configurations for known issues.

Machine Learning Module

The communication module 352 can pass the query data, or a pointer to the data in memory, to the machine learning module 354. The machine learning module 354 can be configured to input at least a portion of data from the set of telecommunications data records into a machine learning model to identify one or more anomalous occurrences. The machine learning model can be trained to identify anomalous occurrences from patterns in user device information and network performance metrics. According to some examples, prior to inputting the data into a machine learning model, the machine learning module 354 can perform one or more preprocessing steps. For example, the system can perform data cleaning, exploratory data analysis (EDA), feature engineering, data transformation (e.g., label encoder, standard scaler, principal component analysis (PCA), imputation, etc.

Furthermore, according to some examples, the machine learning module 354 can choose a machine learning model from a plurality of machine learning models. The plurality of machine learning models can be considered to be a registry of models that have been evaluated and/or permissioned by an operator. The module can select a model from the plurality of models based on the model type or data type. In some cases, the system can utilize a first model for identifying anomalous behavior at a site, and a second model for identifying anomalous behavior at a specific end user device (e.g., device 310 or 355). As described herein, once a model is selected, the module can input at least a portion of data from the set of telecommunications data records into the machine learning model to identify one or more instances of anomalous occurrences. For example, the model can output a timestamp at which anomalous behavior occurred.

According to some examples, the machine learning module can include a registry of machine learning models trained to identify anomalous occurrences such as network degradation. For example, any one of the models in the registry can be suitable for use in identifying network degradation. Each of the models can be a different type of model and/or can be more effective or efficient on certain types of data. In one example, each model can be specifically trained on specific sets of KPIs that are obtained from different components of the telecommunications network. In one example, a primary machine learning model can be better suited to identify anomalous occurrences in site-level metrics (e.g., trained on site-level metrics), while a secondary machine learning model can be better suited to identify anomalous occurrences in device-specific metrics.

In some examples, machine learning models in the registry can be periodically evaluated using performance metrics such as accuracy, precision, recall, F1 score, ROC AUC score, confusion matrix, and/or a combination of the metrics. After periodically evaluating the machine learning models of the registry of machine learning models to obtain values for a plurality of metrics, the machine learning module 354 can determine whether to replace the machine learning models. For example, responsive to determining that the performance metrics corresponding to a model of the registry of machine learning models do not meet or exceed a predetermined threshold, the module can remove the model from the registry temporarily and perform refinement of the machine learning model. While a poorly performing machine learning model is refined, a different model from the registry can be loaded and executed instead.

In some examples, the interval of time after which the machine learning models are evaluated can be predetermined by an operator or can be dynamically determined based on the type of machine learning model, or infrastructure available for updating and deploying models. For example, if the infrastructure is available to do so, the system can trigger evaluation and refinement of models. Alternatively or additionally, the machine learning model can be triggered to be evaluated, e.g., such as by a permissioned operator.

As described herein, the machine learning model(s) can be trained by accessing a training set of telecommunications data records comprising values indicative of network degradation, e.g., from the data lake or a separate repository. The training set of telecommunications data records can be used to train the model to identify patterns in telecommunications data records corresponding to network degradation.

Aggregation Module

As described herein, responsive to machine learning module 354 identifying one or more instances of anomalous occurrences, the machine learning module can pass data identifying the instances to the aggregation module 356. Aggregation module 356 can be configured to append data regarding the one or more anomalous occurrences to a first data structure storing anomalous occurrences across the telecommunications service network.

For example, FIG. 4A is an example of a first data structure 400 storing anomalous occurrences across the telecommunications service network. The aggregation module 356 can append data 410A that includes relevant information needed to perform a correlation analysis downstream. In the example of FIG. 4A, data 410A includes a timestamp indicating when the anomaly occurred. In some instances, the timestamp can instead be a time interval that indicates both a start and end period for the anomalous occurrence. The data 410A can also include the type of anomaly, the severity of the anomaly, as well as affected KPIs, location, device identifier (e.g., IMEI), the technology used, and the duration of the anomalous instance. In some instances, the machine learning module 354 can output all data relating to an anomalous event and the aggregation module 356 can parse and extract the relevant parameters to generate the data 410A.

In order to perform correlation analysis between the aggregated anomalous occurrences and the changes in device conditions and/or network operability conditions, the aggregation module 356 can also aggregate all changes that can be an underlying cause for the anomalous occurrences in a second data structure. As described herein, the communication module 352 can access, from a plurality of different network elements of the telecommunications service network, values of metrics indicative of changes in device conditions, network operability conditions, or both. The communication module 352 can pass this data, or a pointer to the data in memory to the aggregation module 356, where the relevant parameters can be parsed and extracted. The data can then be aggregated as the second data structure.

For example, FIG. 4B is an example of a second data structure 420 generated by aggregating the accessed values of the metrics indicative of changes in device conditions and/or network operability conditions. For example, data 430A relates to a configuration update that had been made. Data 430A includes the type of change, the timestamp of the change, reason for doing the change, status, initiator (e.g., operator), dependencies, scope of impact, network elements that were affected, etc.

Correlation Generation Module

The aggregation module can pass the one or more anomalous occurrences stored in the first data structure and changes in device conditions and/or network operability conditions stored in the second data structure to the correlation generation module 358. The correlation generation module 358 can be configured to perform a correlation analysis to determine which of the changes in device conditions and/or network operability conditions are causing the anomalous occurrence (e.g., network degradation).

According to some examples, the correlation generation module can use the timestamps of both the anomalies and the events/changes to align them. The correlation generation module can identify events or changes that occurred shortly before or during the time of the anomaly. Alternatively or additionally, the system can define a time window to capture events that could have caused or contributed to the anomalous occurrence. For example, the system can analyze events that happened in the 5-10 minutes leading up to the anomaly or system changes made in the preceding hours or days.

According to some examples, the system can identify which events or changes correspond with noticeable shifts in the affected KPIs. For instance, if a latency spike occurred, the correlation generation module can look for events that affect network routing or bandwidth allocation. Alternatively or additionally, the system can use statistical methods such as Pearson correlation or Spearman rank correlation to measure the degree of correlation between specific events/changes and the changes in the KPIs. According to some examples, the system can analyze how frequently a particular event or change type (e.g., software updates, configuration changes) coincides with anomalies. For example, events that consistently correlate with anomalies across different timeframes are more likely to be causal.

According to some examples, the correlation module can check anomalous KPI (e.g., KPI directly determined to be anomalous or KPI associated with other measurements determined to be anomalous) and can identify all possible changes in device conditions and/or network operability (e.g., events) that align with timestamps during which the anomalous occurrence occurred. For example, the timestamps that align with the anomalous occurrence can be those that are within a time period defined by the start and end of the anomalous occurrence or within a proximity of the start and end of the anomalous occurrence. This proximity in time can be pre-determined, e.g., such as set by an operator or can be determined dynamically based on the anomalous occurrence length, the change in device condition and/or network operability, or the like. In some examples, all changes in device conditions and/or network operability from those timestamps can be generated or stored as a list, e.g., for downstream use and processing.

According to some embodiments, an anomalous occurrence and associated changes in device conditions and/or network operability, such as special events, can be determined through a value calculated as a function of a total number of degraded network elements, number of impacted customers and/or event weights. In particular, the system can look at events that occurred around the period of time of the anomalous occurrences. The system can generate a correlation score based on total number of degraded network elements, number of impacted customers and/or event weights where the value can be higher for events that degraded or otherwise affected many network elements, higher where more customers are impacted by the event, and/or can be higher (e.g., weighed more heavily) where the event is historically found to have caused more anomalous occurrences. These weights can be stored or otherwise accessed by the system. In some examples, for each change in device conditions and/or network operability (e.g., also referred to herein as co-factors of the anomalous occurrences), a factor can be calculated and compared against other factors to determine which device conditions and/or network operability correlates most strongly with the anomalous event.

In one example, if an anomalous occurrence is detected in a first period of time, the system can identify events such as a change event in antenna tilt and network outage event that occurred during a same period of time. During correlation, the system can determine which event is most correlated, e.g., likely to have caused the anomalous event. In the example of the antenna tilt change event and network outage event, even where an antenna tilt change event is found to be associated with a highest number with degradation occurrences and with most impacted customers, a network outage that occurred more closely in time with the anomalous event can be determined to be a more probable contributor to the anomalous occurrence, e.g., customer experience degradation. The events that are considered are all packaged for the operator's review such as shown in the correlation automation workflow details in FIG. 5. As described herein, the system can involve a thorough and consistent approach to determining correlation co-factors and perform retuning of machine learning models (e.g., periodically) to ensure accuracy through detailed checks and validations.

According to some examples, the system can also consider the seasonality change factor in the calculations or during determination of correlated co-factors. For example, seasonality change factor can relate to predictable patterns in data that occur at specific times (e.g., seasonality), such as certain days of the week, months, or seasons of the year. For example, voice drop calls are expected to be higher during summer because of dense tree leaves which have significant impact on how electromagnetic waves propagate, however quality of voice calls can start to improve during fall and winter. The system can calculate the numerical value or seasonal factor that quantifies the influence of seasonal patterns on a dataset. In this case, the seasonal factor can be used as a multiplier to adjust predictable variations in KPI that occur on specific season. In one example, if a KPI is measured at a timestep associated with a time period where it is a typically higher value, the seasonal factor can be a multiplier less than 1 such that the calculation is adjusted for the seasonality. If the KPI is measured at a timestep associated with a time period where it is a typically lower value, the seasonal factor can be a multiplier larger than 1 such that the calculation is adjusted for the seasonality.

Once the correlation between the one or more anomalous occurrences stored in the first data structure and one or more changes in a subset of device conditions and/or network operability conditions stored in the second data structure is established, the system can generate instructions to generate a graphical user interface (GUI) that presents the data to an operator or user at a remote device. For example, once the instructions are generated, the system can cause display, via an API, e.g., by transmitting an instruction for causing the user device to display the response via the communication module 352. One such example of a GUI is display 500 of FIG. 5.

Figure 5:
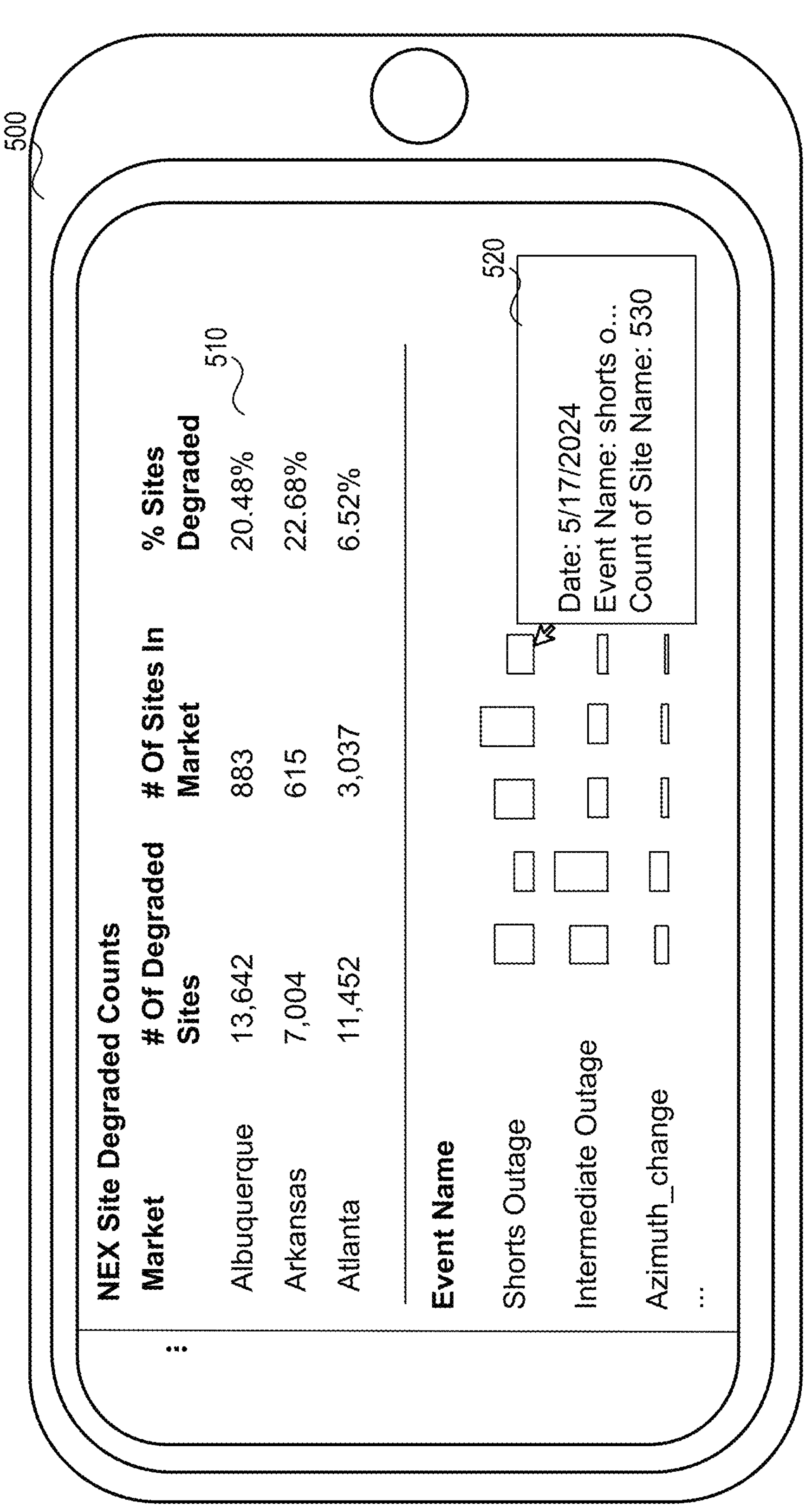
FIG. 5 is an illustrative user interface through which an operator can query and receive anomaly data, in accordance with embodiments herein.

For example, FIG. 5 includes a first display area 510 which displays to the user (e.g., operator) the different markets and degraded sites, e.g., by location. A second display area 520 displays to the user the number of events (e.g., changes in device conditions, network operability conditions) that occurred by date and by type of event.

Flow Diagram

Figure 6:
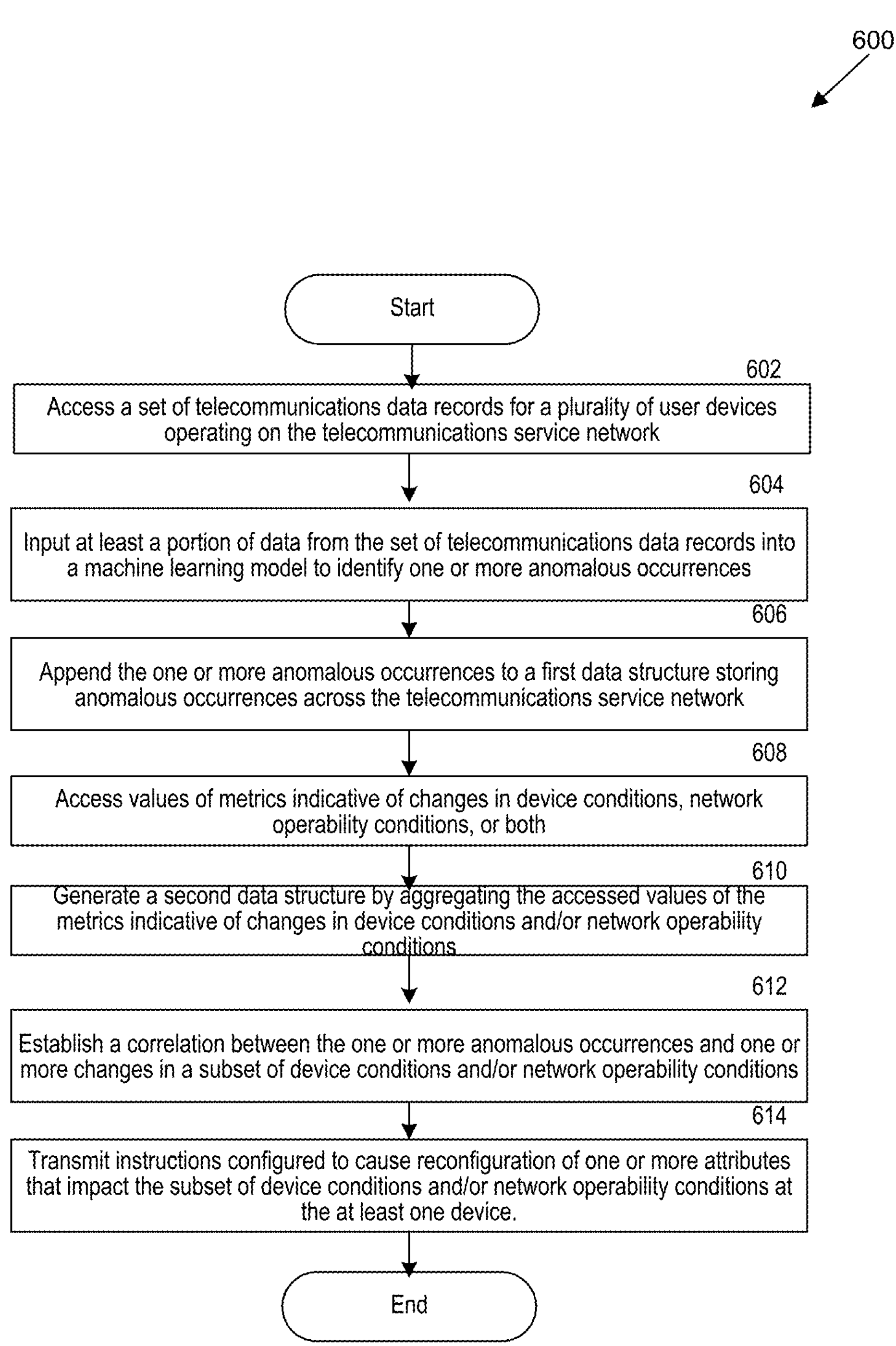
FIG. 6 is a flow diagram illustrating a process for assessing anomalous occurrences at a telecommunications service network, in accordance with embodiments herein.

FIG. 6 is a flow diagram illustrating a process for assessing anomalous occurrences at a telecommunications service network, in accordance with embodiments herein. Process 600 begins at block 602 where a system (e.g., such as anomaly detection and correlation system 350) accesses a set of telecommunications data records for a plurality of user devices operating on the telecommunications service network (as discussed above in reference to the communication module 352).

At block 604, process 600 includes inputting at least a portion of data from the set of telecommunications data records into a machine learning model to identify one or more anomalous occurrences (as discussed above in reference to the machine learning module 354). Process 600 then proceeds to block 606, where the system appends the one or more anomalous occurrences to a first data structure storing anomalous occurrences across the telecommunications service network (as discussed above in reference to the aggregation module 356). At block 608, process 600 accesses values of metrics indicative of changes in device conditions, network operability conditions, or both and at block 610, generates a second data structure by aggregating the accessed values of the metrics indicative of changes in device conditions and/or network operability conditions The process proceeds to block 612, where the system establishes a correlation between the one or more anomalous occurrences and one or more changes in a subset of device conditions and/or network operability conditions (as discussed above in reference to the correlation generation module 358). At block 614, the system transmits instructions configured to cause reconfiguration of one or more attributes that impact the subset of device conditions and/or network operability conditions at the at least one device.

AI System

Figure 7:
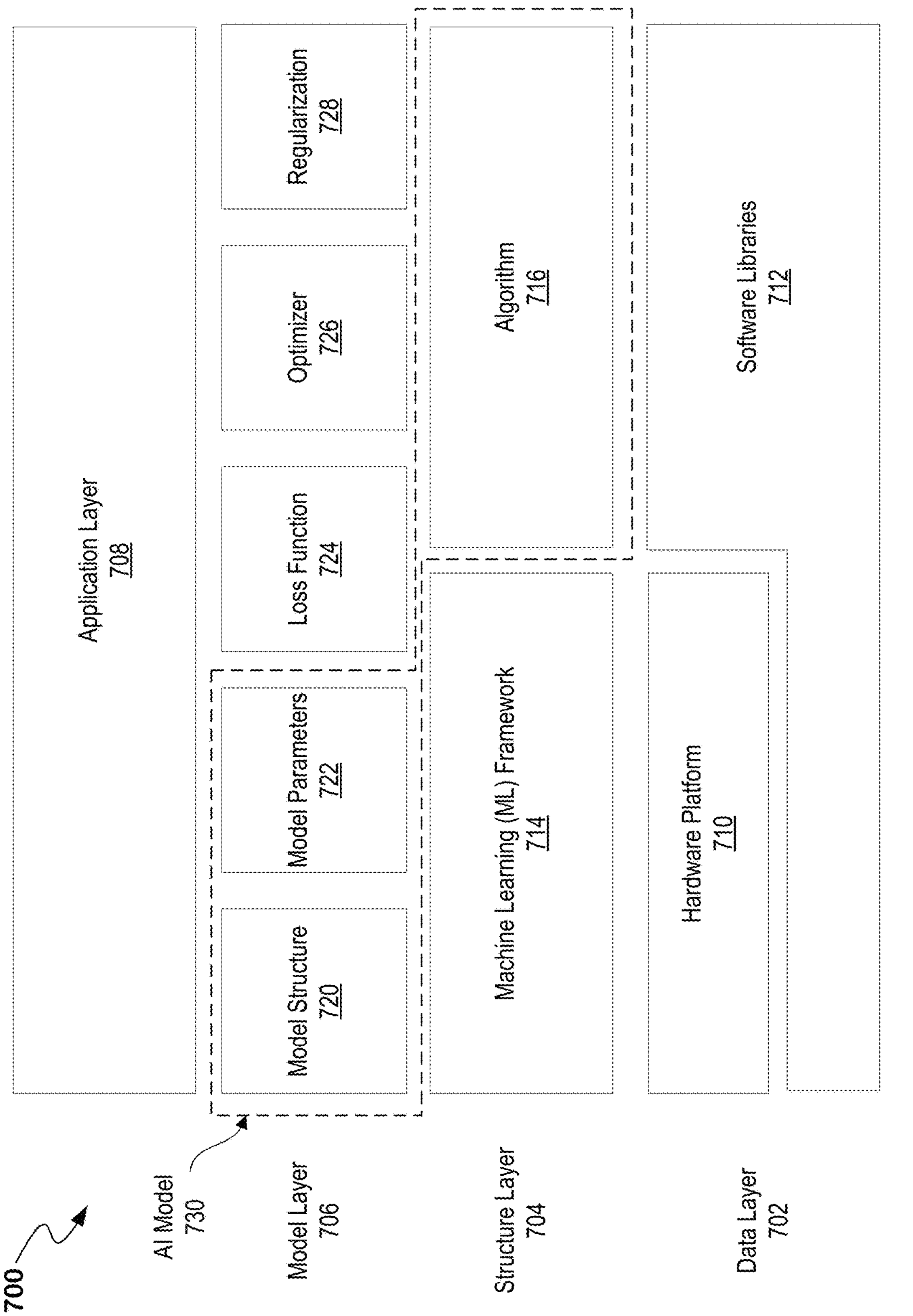
FIG. 7 is high-level block diagram illustrating an example AI system, in accordance with one or more implementations.

FIG. 7 is a block diagram illustrating an example artificial intelligence (AI) system 700, in accordance with one or more implementations of this disclosure. The AI system 700 is implemented using components of the example computer system 800 illustrated and described in more detail with reference to FIG. 8. For example, the AI system 700 can be implemented using the processor 802 and instructions 808 programmed in the memory 806 illustrated and described in more detail with reference to FIG. 8. Likewise, implementations of the AI system 700 can include different and/or additional components or be connected in different ways.

As shown, the AI system 700 can include a set of layers, which conceptually organize elements within an example network topology for the AI system's architecture to implement a particular AI model 730. Generally, an AI model 730 is a computer-executable program implemented by the AI system 700 that analyzes data to make predictions. Information can pass through each layer of the AI system 700 to generate outputs for the AI model 730. The layers can include a data layer 702, a structure layer 704, a model layer 706, and an application layer 708. The algorithm 716 of the structure layer 704 and the model structure 720 and model parameters 722 of the model layer 706 together form the example AI model 730. The optimizer 726, loss function engine 724, and regularization engine 728 work to refine and optimize the AI model 730, and the data layer 702 provides resources and support for application of the AI model 730 by the application layer 708.

The data layer 702 acts as the foundation of the AI system 700 by preparing data for the AI model 730. As shown, the data layer 702 can include two sub-layers: a hardware platform 710 and one or more software libraries 712. The hardware platform 710 can be designed to perform operations for the AI model 730 and include computing resources for storage, memory, logic, and networking, such as the resources described in relation to FIG. 8. The hardware platform 710 can process amounts of data using one or more servers. The servers can perform backend operations such as matrix calculations, parallel calculations, machine learning (ML) training, and the like. Examples of servers used by the hardware platform 710 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but can be used for AI applications due to their vast computing and memory resources. GPUs use a parallel structure that generally makes their processing more efficient than that of CPUs. In some instances, the hardware platform 710 can include Infrastructure as a Service (IaaS) resources, which are computing resources, (e.g., servers, memory, etc.) offered by a cloud services provider. The hardware platform 710 can also include computer memory for storing data about the AI model 730, application of the AI model 730, and training data for the AI model 730. The computer memory can be a form of random-access memory (RAM), such as dynamic RAM, static RAM, and non-volatile RAM.

The software libraries 712 can be thought of as suites of data and programming code, including executables, used to control the computing resources of the hardware platform 710. The programming code can include low-level primitives (e.g., fundamental language elements) that form the foundation of one or more low-level programming languages, such that servers of the hardware platform 710 can use the low-level primitives to carry out specific operations. The low-level programming languages do not require much, if any, abstraction from a computing resource's instruction set architecture, allowing them to run quickly with a small memory footprint. Examples of software libraries 712 that can be included in the AI system 700 include INTEL MATH KERNEL LIBRARY, NVIDIA CUDNN, EIGEN, AND OPEN BLAS.

The structure layer 704 can include a machine learning (ML) framework 714 and an algorithm 716. The ML framework 714 can be thought of as an interface, library, or tool that allows users to build and deploy the AI model 730. The ML framework 714 can include an open-source library, an application programming interface (API), a gradient-boosting library, an ensemble method, and/or a deep learning toolkit that works with the layers of the AI system to facilitate development of the AI model 730. For example, the ML framework 714 can distribute processes for application or training of the AI model 730 across multiple resources in the hardware platform 710. The ML framework 714 can also include a set of pre-built components that have the functionality to implement and train the AI model 730 and allow users to use pre-built functions and classes to construct and train the AI model 730. Thus, the ML framework 714 can be used to facilitate data engineering, development, hyperparameter tuning, testing, and training for the AI model 730.

Examples of ML frameworks 714 or libraries that can be used in the AI system 700 include TensorFlow, PyTorch, Scikit-Learn, Keras, and Cafffe. Random Forest is a machine learning algorithm that can be used within the ML frameworks 714. LightGBM is a gradient boosting framework/algorithm (an ML technique) that can be used. Other techniques/algorithms that can be used are XGBoost, CatBoost, etc. Amazon Web Services is a cloud service provider that offers various machine learning services and tools (e.g., Sage Maker) that can be used for platform building, training, and deploying ML models.

In some implementations, the ML framework 714 performs deep learning (also known as deep structured learning or hierarchical learning) directly on the input data to learn data representations, as opposed to using task-specific algorithms. In deep learning, no explicit feature extraction is performed; the features of feature vector are implicitly extracted by the AI system 700. For example, the ML framework 714 can use a cascade of multiple layers of nonlinear processing units for implicit feature extraction and transformation. Each successive layer uses the output from the previous layer as input. The AI model 730 can thus learn in supervised (e.g., classification) and/or unsupervised (e.g., pattern analysis) modes. The AI model 730 can learn multiple levels of representations that correspond to different levels of abstraction, wherein the different levels form a hierarchy of concepts. In this manner, AI model 730 can be configured to differentiate features of interest from background features.

The algorithm 716 can be an organized set of computer-executable operations used to generate output data from a set of input data and can be described using pseudocode. The algorithm 716 can include complex code that allows the computing resources to learn from new input data and create new/modified outputs based on what was learned. In some implementations, the algorithm 716 can build the AI model 730 through being trained while running computing resources of the hardware platform 710. This training allows the algorithm 716 to make predictions or decisions without being explicitly programmed to do so. Once trained, the algorithm 716 can run at the computing resources as part of the AI model 730 to make predictions or decisions, improve computing resource performance, or perform tasks. The algorithm 716 can be trained using supervised learning, unsupervised learning, semi-supervised learning, and/or reinforcement learning.

Using supervised learning, the algorithm 716 can be trained to learn patterns (e.g., map input data to output data) based on labeled training data. The training data can be labeled by an external user or operator. For instance, a user can collect a set of training data, such as by capturing user device performance metrics, device data, network data, historical communication sessions, and the like. The user can label the training data based on one or more classes and trains the AI model 730 by inputting the training data to the algorithm 716. The algorithm determines how to label the new data based on the labeled training data. The user can facilitate collection, labeling, and/or input via the ML framework 714. In some instances, the user can convert the training data to a set of feature vectors for input to the algorithm 716. Once trained, the user can test the algorithm 716 on new data to determine if the algorithm 716 is predicting accurate labels for the new data. For example, the user can use cross-validation methods to test the accuracy of the algorithm 716 and retrain the algorithm 716 on new training data if the results of the cross-validation are below an accuracy threshold.

Supervised learning can involve classification and/or regression. Classification techniques involve teaching the algorithm 716 to identify a category of new observations based on training data and are used when input data for the algorithm 716 is discrete. Said differently, when learning through classification techniques, the algorithm 716 receives training data labeled with categories (e.g., classes) and determines how features observed in the training data (e.g., network performance, device history, etc.) relate to the categories (e.g., anomalous occurrences associated with network degradation). Once trained, the algorithm 716 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 716 is continuous. Regression techniques can be used to train the algorithm 716 to predict or forecast relationships between variables. To train the algorithm 716 using regression techniques, a user can select a regression method for estimating the parameters of the model. The user collects and labels training data that is input to the algorithm 716 such that the algorithm 716 is trained to understand the relationship between data features and the dependent variable(s). Once trained, the algorithm 716 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 716 learns patterns from unlabeled training data. In particular, the algorithm 716 is trained to learn hidden patterns and insights of input data, which can be used for data exploration or for generating new data. Here, the algorithm 716 does not have a predefined output, unlike the labels output when the algorithm 716 is trained using supervised learning. Another way unsupervised learning is used to train the algorithm 716 to find an underlying structure of a set of data is to group the data according to similarities and represent that set of data in a compressed format. The network 100 disclosed herein can use unsupervised learning to identify patterns in data received.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 716 can be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 716 can be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that can be used by the algorithm 616 include factor analysis, item response theory, latent profile analysis, and latent class analysis.

In some implementations, the AI system 700 trains the algorithm 716 of AI model 730, based on the training data, to correlate the feature vector to expected outputs in the training data. As part of the training of the AI model 730, the AI system 700 forms a training set of features and training labels by identifying a positive training set of features that have been determined to have a desired property in question, and, in some implementations, forms a negative training set of features that lack the property in question. The AI system 700 applies ML framework 714 to train the AI model 730, that when applied to the feature vector, outputs indications of whether the feature vector has an associated desired property or properties, such as a probability that the feature vector has a particular Boolean property, or an estimated value of a scalar property. The AI system 700 can further apply dimensionality reduction (e.g., via linear discriminant analysis (LDA), PCA, or the like) to reduce the amount of data in the feature vector to a smaller, more representative set of data.

The model layer 706 implements the AI model 730 using data from the data layer and the algorithm 716 and ML framework 714 from the structure layer 704, thus enabling decision-making capabilities of the AI system 700. The model layer 706 includes a model structure 720, model parameters 722, a loss function engine 724, an optimizer 726, and a regularization engine 728.

The model structure 720 describes the architecture of the AI model 730 of the AI system 700. The model structure 720 defines the complexity of the pattern/relationship that the AI model 730 expresses. Examples of structures that can be used as the model structure 720 include decision trees, support vector machines, regression analyses, Bayesian networks, Gaussian processes, genetic algorithms, and artificial neural networks (or, simply, neural networks). The model structure 720 can include a number of structure layers, a number of nodes (or neurons) at each structure layer, and activation functions of each node. Each node's activation function defines how to node converts data received to data output. The structure layers can include an input layer of nodes that receive input data, an output layer of nodes that produce output data. The model structure 720 can include one or more hidden layers of nodes between the input and output layers. The model structure 720 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 722 represent the relationships learned during training and can be used to make predictions and decisions based on input data. The model parameters 722 can weight and bias the nodes and connections of the model structure 720. For instance, when the model structure 720 is a neural network, the model parameters 722 can weight and bias the nodes in each layer of the neural networks, such that the weights determine the strength of the nodes and the biases determine the thresholds for the activation functions of each node. The model parameters 722, in conjunction with the activation functions of the nodes, determine how input data is transformed into desired outputs. The model parameters 722 can be determined and/or altered during training of the algorithm 716.

The loss function engine 724 can determine a loss function, which is a metric used to evaluate the AI model's 730 performance during training. For instance, the loss function engine 724 can measure the difference between a predicted output of the AI model 730 and the actual output of the AI model 730 and is used to guide optimization of the AI model 730 during training to minimize the loss function. The loss function can be presented via the ML framework 714, such that a user can determine whether to retrain or otherwise alter the algorithm 716 if the loss function is over a threshold. In some instances, the algorithm 716 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 726 adjusts the model parameters 722 to minimize the loss function during training of the algorithm 716. In other words, the optimizer 726 uses the loss function generated by the loss function engine 724 as a guide to determine what model parameters lead to the most accurate AI model 730. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 726 used can be determined based on the type of model structure 720 and the size of data and the computing resources available in the data layer 702.

The regularization engine 728 executes regularization operations. Regularization is a technique that prevents over- and under-fitting of the AI model 730. Overfitting occurs when the algorithm 716 is overly complex and too adapted to the training data, which can result in poor performance of the AI model 730. Underfitting occurs when the algorithm 716 is unable to recognize even basic patterns from the training data such that it cannot perform well on training data or on validation data. The regularization engine 728 can apply one or more regularization techniques to fit the algorithm 716 to the training data properly, which helps constraint the resulting AI model 730 and improves its ability for generalized application. Examples of regularization techniques include lasso (L1) regularization, ridge (L2) regularization, and elastic (L1 and L2 regularization).

In some implementations, the AI system 700 can include a feature extraction module implemented using components of the example computer system 800 illustrated and described in more detail with reference to FIG. 8. In some implementations, the feature extraction module extracts a feature vector from input data. The feature vector includes n features (e.g., feature a, feature b, . . . , feature n). The feature extraction module reduces the redundancy in the input data, e.g., repetitive data values, to transform the input data into the reduced set of features such as feature vector. The feature vector contains the relevant information from the input data, such that events or data value thresholds of interest can be identified by the AI model 730 by using this reduced representation. In some example implementations, the following dimensionality reduction techniques are used by the feature extraction module: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

Computer System

Figure 8:
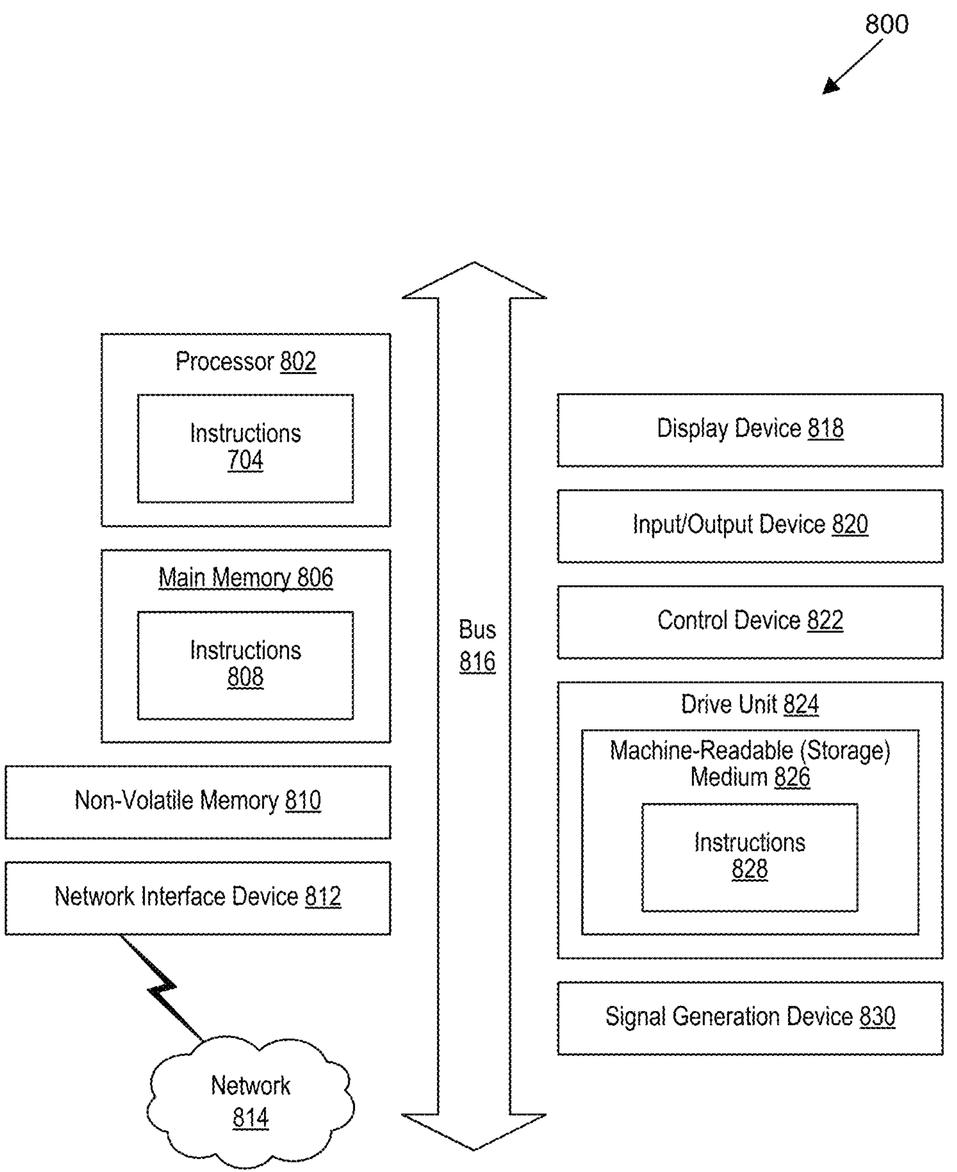
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a video display device 818, an input/output device 820, a control device 822 (e.g., keyboard and pointing device), a drive unit 824 that includes a machine-readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 shares a similar architecture as that of a server computer, PC, tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by the computing system 800. In some implementations, the computer system 800 can be an embedded computer system, a system-on-chip (SOC), a single-board computer (SBC) system or a distributed system such as a mesh of computer systems, or include one or more cloud components in one or more networks. Where appropriate, one or more computer systems 800 can perform operations in real time, near real time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable (storage) medium 826) can be local, remote, or distributed. Although shown as a single medium, the machine-readable (storage) medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computing system 800. The machine-readable (storage) medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808) set at various times in various memory and storage devices in computing device(s). When read and executed by the processor 802, the instruction(s) cause the computing system 800 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number can also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A computer-implemented method for assessing anomalous occurrences at a telecommunications service network, the computer-implemented method comprising:

accessing, from a centralized repository, a set of telecommunications data records for a plurality of user devices operating on the telecommunications service network, wherein the set of telecommunications data records comprises (a) user device information for the plurality of user devices, (b) network performance metrics, and (c) disparate types of telecommunications data records including enhanced data records (EDRs) or call data records (CDRs);

inputting at least a portion of data from the set of telecommunications data records into a machine learning model to identify one or more anomalous occurrences, wherein the machine learning model is trained to identify anomalous occurrences from patterns in user device information and network performance metrics;

appending the one or more anomalous occurrences to a first data structure storing anomalous occurrences across the telecommunications service network;

accessing, from a plurality of different network elements of the telecommunications service network, values of metrics indicative of changes in device conditions, network operability conditions, or both;

wherein the changes in device conditions and/or network operability conditions comprise seasonal changes, device changes, location changes, user call patterns, or changes in network events or customer lifestyle;

generating a second data structure by aggregating the accessed values of the metrics indicative of changes in device conditions and/or network operability conditions;

establishing a correlation between the one or more anomalous occurrences stored in the first data structure and one or more changes in a subset of device conditions and/or network operability conditions stored in the second data structure; and transmitting, to at least one device on the telecommunications service network, instructions configured to cause reconfiguration of one or more attributes that impact the subset of device conditions and/or network operability conditions at the at least one device.

2. The computer-implemented method of claim 1, wherein the one or more anomalous occurrences are occurrences of network degradation, and wherein the computer-implemented method further comprises:

generating first instructions for displaying a number of degraded sites of the telecommunications service network; generating second instructions for displaying the one or more changes in device conditions and/or network operability conditions; and transmitting, to a remote device, the first instructions and the second instructions.

3. The computer-implemented method of claim 1, wherein accessing the metrics indicative of the changes in device conditions and/or network operability conditions comprises accessing network elements specific to a cell site of the telecommunications service network to obtain metrics indicative of changes occurring at a site-specific level.

4. The computer-implemented method of claim 1, wherein the computer-implemented method further comprises standardizing the disparate types of telecommunications data records into a predetermined format.

5. The computer-implemented method of claim 1, wherein the machine learning model is a first machine learning model from a registry of machine learning models, and wherein the computer-implemented method further comprises:

periodically evaluating the machine learning models of the registry of machine learning models to obtain values for a plurality of metrics; responsive to determining that values corresponding to a model of the registry of machine learning models do not meet or exceed a predetermined threshold, removing the model from the registry temporarily; and performing refinement of the machine learning model.

6. The computer-implemented method of claim 1, further comprising:

accessing a training set of telecommunications data records comprising values indicative of network degradation; and training the machine learning model using the training set of telecommunications data records to identify patterns in telecommunications data records corresponding to network degradation.

7. One or more non-transitory computer-readable media containing instructions which when executed by a processor, perform a method for assessing anomalous occurrences at a telecommunications service network, the method comprising:

accessing, from a centralized repository, a set of telecommunications data records for a plurality of user devices operating on the telecommunications service network, wherein the set of telecommunications data records comprise (a) user device information for the plurality of user devices, (b) network performance metrics, and (c) disparate types of telecommunications data records including enhanced data records (EDRs) or call data records (CDRs);

inputting at least a portion of data from the set of telecommunications data records into a machine learning model to identify one or more anomalous occurrences, wherein the machine learning model is trained to identify anomalous occurrences from patterns in user device information and network performance metrics;

appending the one or more anomalous occurrences to a first data structure storing anomalous occurrences across the telecommunications service network;

accessing, from a plurality of different network elements of the telecommunications service network, values of metrics indicative of changes in device conditions, network operability conditions, or both;

wherein the changes in device conditions and/or network operability conditions comprise seasonal changes, device changes, location changes, user call patterns, or changes in network events or customer lifestyle;

generating a second data structure by aggregating the accessed values of the metrics indicative of changes in device conditions and/or network operability conditions;

establishing a correlation between the one or more anomalous occurrences stored in the first data structure and one or more changes in a subset of device conditions and/or network operability conditions stored in the second data structure; and transmitting, to at least one device on the telecommunications service network, instructions configured to cause reconfiguration of one or more attributes that impact the subset of device conditions and/or network operability conditions at the at least one device.

8. The one or more non-transitory computer-readable media of claim 7, wherein the method further comprises:

generating first instructions for displaying a number of degraded sites of the telecommunications service network; generating second instructions for displaying changes in device and network operability conditions; and transmitting, to a remote device, the first instructions and the second instructions.

9. The one or more non-transitory computer-readable media of claim 7, wherein accessing the metrics indicative of changes in device operability conditions comprises accessing network elements specific to a cell site of the telecommunications service network to obtain metrics indicative of changes occurring at a site-specific level.

10. The one or more non-transitory computer-readable media of claim 7, wherein the method further comprises standardizing the disparate types of telecommunications data records into a predetermined format.

11. The one or more non-transitory computer-readable media of claim 7, wherein the machine learning model is a first machine learning model from a registry of machine learning models, and wherein the method further comprises:

periodically evaluating the machine learning models of the registry of machine learning models to obtain values for a plurality of metrics; responsive to determining that values corresponding to a model of the registry of machine learning models do not meet or exceed a predetermined threshold, removing the model from the registry temporarily; and performing refinement of the machine learning model.

12. The one or more non-transitory computer-readable media of claim 7, wherein the method further comprises:

accessing a training set of telecommunications data records comprising values indicative of network degradation; and training the machine learning model using the training set of telecommunications data records to identify patterns in telecommunications data records corresponding to network degradation.

13. A system for assessing anomalous occurrences at a telecommunications service network, the system comprising:

one or more processors; and one or more non-transitory computer-readable media storing instructions that, when executed by the one or more processors, cause operations comprising:

accessing, from a centralized repository, a set of telecommunications data records for a plurality of user devices operating on the telecommunications service network, wherein the set of telecommunications data records comprise (a) user device information for the plurality of user devices (b) network performance metrics, and (c) disparate types of telecommunications data records including enhanced data records (EDRs) or call data records (CDRs);

inputting at least a portion of data from the set of telecommunications data records into a machine learning model to identify one or more anomalous occurrences, wherein the machine learning model is trained to identify anomalous occurrences from patterns in user device information and network performance metrics;

appending the one or more anomalous occurrences to a first data structure storing anomalous occurrences across the telecommunications service network;

accessing, from a plurality of different network elements of the telecommunications service network, values of metrics indicative of changes in device conditions, network operability conditions, or both;

wherein the changes in device conditions and/or network operability conditions comprise seasonal changes, device changes, location changes, user call patterns, or changes in network events or customer lifestyle;

generating a second data structure by aggregating the accessed values of the metrics indicative of changes in device conditions and/or network operability conditions;

establishing an association between the one or more anomalous occurrences stored in the first data structure and one or more changes in a subset of device conditions and/or network operability conditions stored in the second data structure; and transmitting, to at least one device on the telecommunications service network, instructions configured to cause reconfiguration of one or more attributes that impact the subset of device conditions and/or network operability conditions at the at least one device.

14. The system of claim 13, wherein the one or more anomalous occurrences are occurrences of network degradation, and wherein the one or more non-transitory computer-readable media further cause operations comprising:

generating first instructions for displaying a number of degraded sites of the telecommunications service network; generating second instructions for displaying changes in device and network operability conditions; and transmitting, to a remote device, the first instructions and the second instructions.

15. The system of claim 13, wherein accessing the metrics indicative of changes in device operability conditions comprises accessing network elements specific to a cell site of the telecommunications service network to obtain metrics indicative of changes occurring at a site-specific level.

16. The system of claim 13, wherein the one or more non-transitory computer-readable media further cause operations comprising standardizing the disparate types of telecommunications data records into a predetermined format.

17. The system of claim 13, wherein the machine learning model is a first machine learning model from a registry of machine learning models, and wherein the one or more non-transitory computer-readable media further cause operations comprising:

periodically evaluating the machine learning models of the registry of machine learning models to obtain values for a plurality of metrics;

responsive to determining that values corresponding to a model of the registry of machine learning models do not meet or exceed a predetermined threshold, removing the model from the registry temporarily; and performing refinement of the machine learning model.

18. The system of claim 13, wherein the one or more non-transitory computer-readable media further cause operations comprising:

accessing a training set of telecommunications data records comprising values indicative of network degradation; and training the machine learning model using the training set of telecommunications data records to identify patterns in telecommunications data records corresponding to network degradation.

19. The system of claim 18, wherein the one or more non-transitory computer-readable media further cause operations comprising:

receiving, from a user device of the telecommunications service network, a request to identify a corrective action for mitigating network degradation experienced on the user device;

in response to the request, identifying, by the system, one or more changes that correlate with network degradation experienced on the user device; and transmitting, by the system, instructions to the user device for mitigating the issue.

20. The system of claim 19, wherein the instructions comprise instructions to: (a) perform a software or hardware update, (b) reconfigure data files on the user device, or (c) manually or physically change the device.

* * * * *